United States Patent
Ben Shabtai et al.

(10) Patent No.: US 10,866,883 B2
(45) Date of Patent: Dec. 15, 2020

(54) DETECTION OF GRAPHICAL USER INTERFACE ELEMENT OF APPLICATION UNDERGOING FUNCTIONAL TESTING

(71) Applicant: ENTIT Software LLC, Sanford, NC (US)

(72) Inventors: Avishay Ben Shabtai, Holon (IL); Dror Saaroni, Yahud (IL); Vika Milgrom, Yehud (IL); Anton Kaminsky, Yehud (IL); Yossi Rachelson, Petach Tikwa (IL)

(73) Assignee: MICRO FOCUS LLC, Santa Clara, CA (US)

( * ) Notice: Subject to any disclaimer, the term of this patent is extended or adjusted under 35 U.S.C. 154(b) by 65 days.

(21) Appl. No.: 16/204,158

(22) Filed: Nov. 29, 2018

(65) Prior Publication Data

US 2020/0174911 A1    Jun. 4, 2020

(51) Int. Cl.
| | |
|---|---|
| *G06F 9/44* | (2018.01) |
| *G06F 11/36* | (2006.01) |
| *G06F 11/26* | (2006.01) |
| *G06F 9/451* | (2018.01) |

(52) U.S. Cl.
CPC .......... *G06F 11/3664* (2013.01); *G06F 9/451* (2018.02); *G06F 11/261* (2013.01); *G06F 11/3688* (2013.01); *G06F 11/3692* (2013.01)

(58) Field of Classification Search
CPC .... G06F 11/3664; G06F 9/451; G06F 11/261; G06F 11/3688; G06F 11/3692
USPC ................................................. 717/124–131
See application file for complete search history.

(56) References Cited

U.S. PATENT DOCUMENTS

| | | | | |
|---|---|---|---|---|
| 5,669,000 A | * | 9/1997 | Jessen ................. | G06F 11/3664 714/E11.208 |
| 6,131,185 A | * | 10/2000 | Coskun ............... | G06F 11/3664 714/35 |
| 6,332,211 B1 | * | 12/2001 | Pavela ................ | G06F 11/3664 702/119 |
| 6,505,342 B1 | * | 1/2003 | Hartmann ........... | G06F 11/3688 714/E11.208 |
| 6,993,748 B2 | * | 1/2006 | Schaefer ............. | G06F 11/3664 707/999.003 |

(Continued)

FOREIGN PATENT DOCUMENTS

WO    WO2017164856 A1    9/2017

OTHER PUBLICATIONS

Yang et al, "GUI testing assisted by human knowledge: Random vs. functional", The Journal of Systems and Software, pp. 76-86 (Year: 2014).*

(Continued)

*Primary Examiner* — Anil Khatri

(57) ABSTRACT

A script directing functional testing of an application specifies values for properties of a specific graphical user interface (GUI) and specifies an image of the specific GUI element. A computing device detects whether the application has displayed the specific GUI element by evaluating the values for the properties of the specific GUI element against GUI elements that the application has displayed. If unsuccessful, the computing device detects whether the application has displayed the specific GUI element by evaluating the image of the specific GUI element against a screen image including the GUI elements that the application has displayed.

15 Claims, 5 Drawing Sheets

(56) References Cited

U.S. PATENT DOCUMENTS

| | | | | |
|---|---|---|---|---|
| 7,490,319 | B2* | 2/2009 | Blackwell | G06F 11/3664 |
| | | | | 717/124 |
| 7,757,175 | B2* | 7/2010 | Miller | H04L 67/2819 |
| | | | | 715/738 |
| 7,870,504 | B1* | 1/2011 | McIntosh | G06F 9/452 |
| | | | | 715/803 |
| 8,151,276 | B2* | 4/2012 | Grechanik | G06F 11/3414 |
| | | | | 717/115 |
| 8,365,147 | B2* | 1/2013 | Grechanik | G06F 11/368 |
| | | | | 717/124 |
| 8,572,570 | B2* | 10/2013 | Grechanik | G06F 11/3604 |
| | | | | 717/124 |
| 8,572,573 | B2* | 10/2013 | Baliga | G06F 11/3632 |
| | | | | 717/125 |
| 8,701,090 | B2* | 4/2014 | Zavatone | G06F 11/3692 |
| | | | | 717/124 |
| 8,762,873 | B2 | 6/2014 | Pnueli et al. | |
| 8,793,578 | B2* | 7/2014 | Mounty | G06F 11/3688 |
| | | | | 715/704 |
| 8,826,084 | B1* | 9/2014 | Gauf | G06F 11/3688 |
| | | | | 714/32 |
| 9,135,151 | B2 | 9/2015 | Betak et al. | |
| 9,600,400 | B1* | 3/2017 | McDowell | G06F 11/3428 |
| 9,600,401 | B1* | 3/2017 | Haischt | G06F 11/3664 |
| 9,697,012 | B2 | 7/2017 | Schwartz et al. | |
| 9,767,009 | B2* | 9/2017 | Cobb, Jr. | G06F 11/368 |
| 9,898,396 | B2 | 2/2018 | Owen et al. | |
| 10,733,754 | B2* | 8/2020 | Dayanandan | G06T 7/73 |
| 2012/0124495 | A1 | 5/2012 | Amichai et al. | |

OTHER PUBLICATIONS

Xiaochun et al, "A Test Automation Solution on GUI Functional Test", IEEE, pp. 1413-1418 (Year: 2008).*

Ariss et al, "A Systematic Capture and Replay Strategy for Testing Complex GUI based Java Applications", IEEE, pp. 1038-1043 (Year: 2010).*

Basili et al, "Comparing the Effectiveness of Software Testing Strategies", IEEE pp. 1278-1296 (Year: 1987).*

Howden, "Functional Program Testing", IEEE, pp. 162-169 (Year: 1980).*

Lamancha et al, "Software Product Line Testing A Systematic Review", In Proceedings of the 4th International Conference on Software and Data Technologies, pp. 23-30 (Year: 2009).*

Farooq et al, "An Externally Replicated Experiment to Evaluate Software Testing Methods", ACM, pp. 72-77 (Year: 2013).*

Kamal et al, "Enhancing the Automation of GUI Testing", ACM, pp. 66-70 (Year: 2019).*

Nguyen et al, Model-Based Testing of Multiple GUI Variants Using the GUI Test Generator, ACM, pp. 24-30 (Year: 2010).*

Carmi, A., "Can Image-Based Functional Test Automation Tools Automate Visual Testing?", Applitools, Sep. 23, 2013, 13 pp.

Kushwah, SS., "How Object Identification Works in UFT/QTP (Advance Concepts)", Automation Insights Blog, <https://sumeetkushwah.com/2015/07/21/how-object> Jul. 21, 2015 11 pp.

* cited by examiner

ACCOUNT NAME | Mary Smith
ACCOUNT NUMBER | 5555 5555 5555 4444
EXPIRATION DATE | 02/2022

102

CANCEL    OK

Are you sure you want to change your account number to the account ending in 4444?

112

NO    YES

114

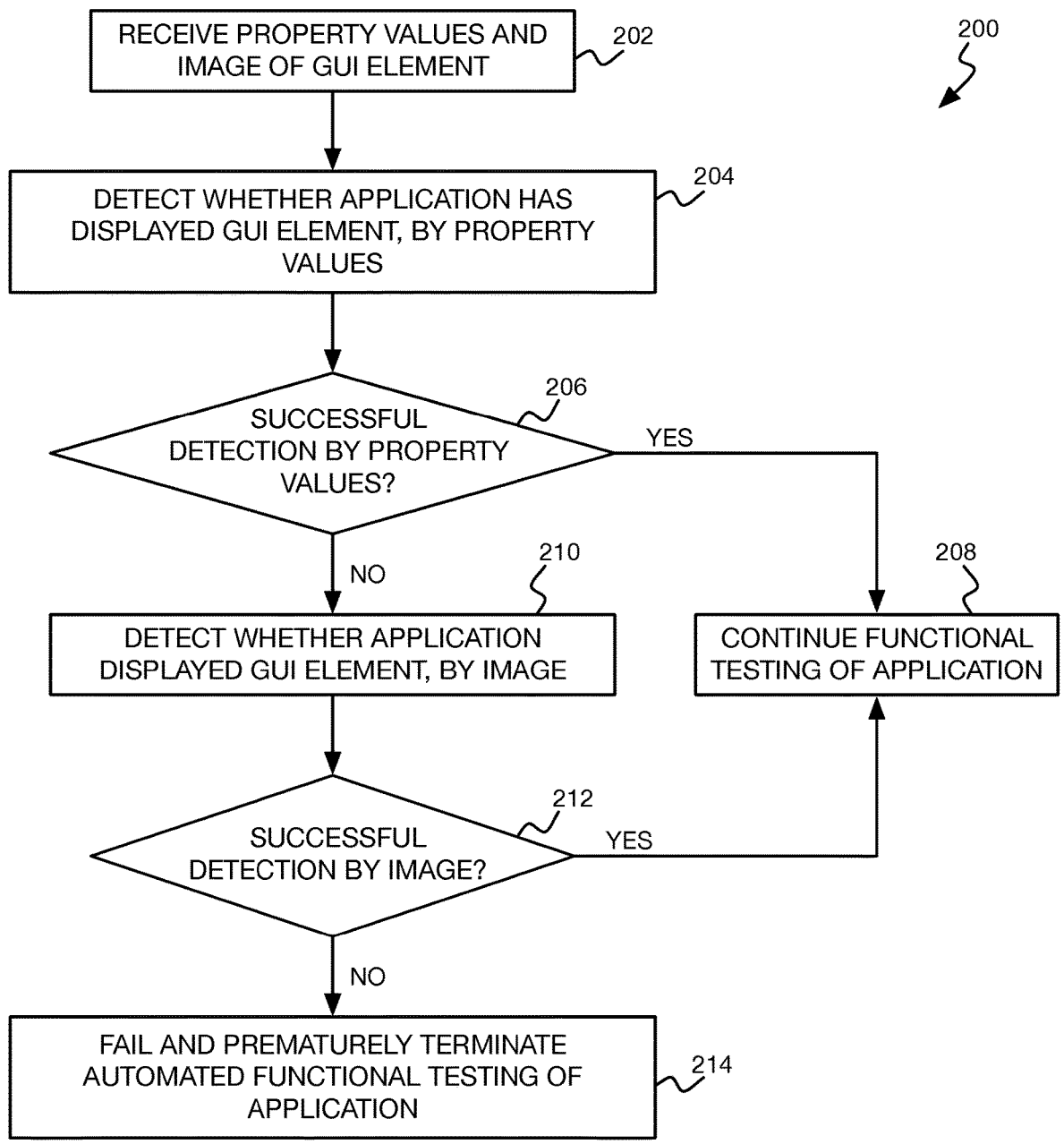

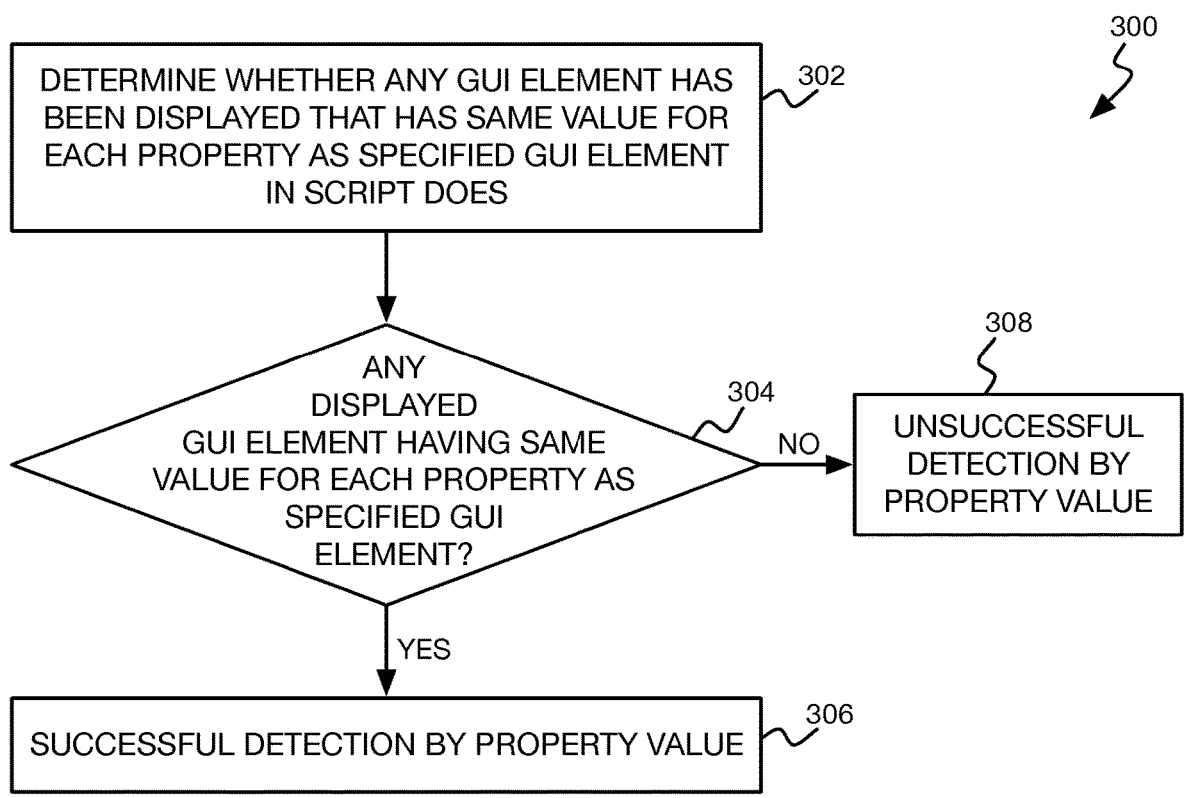

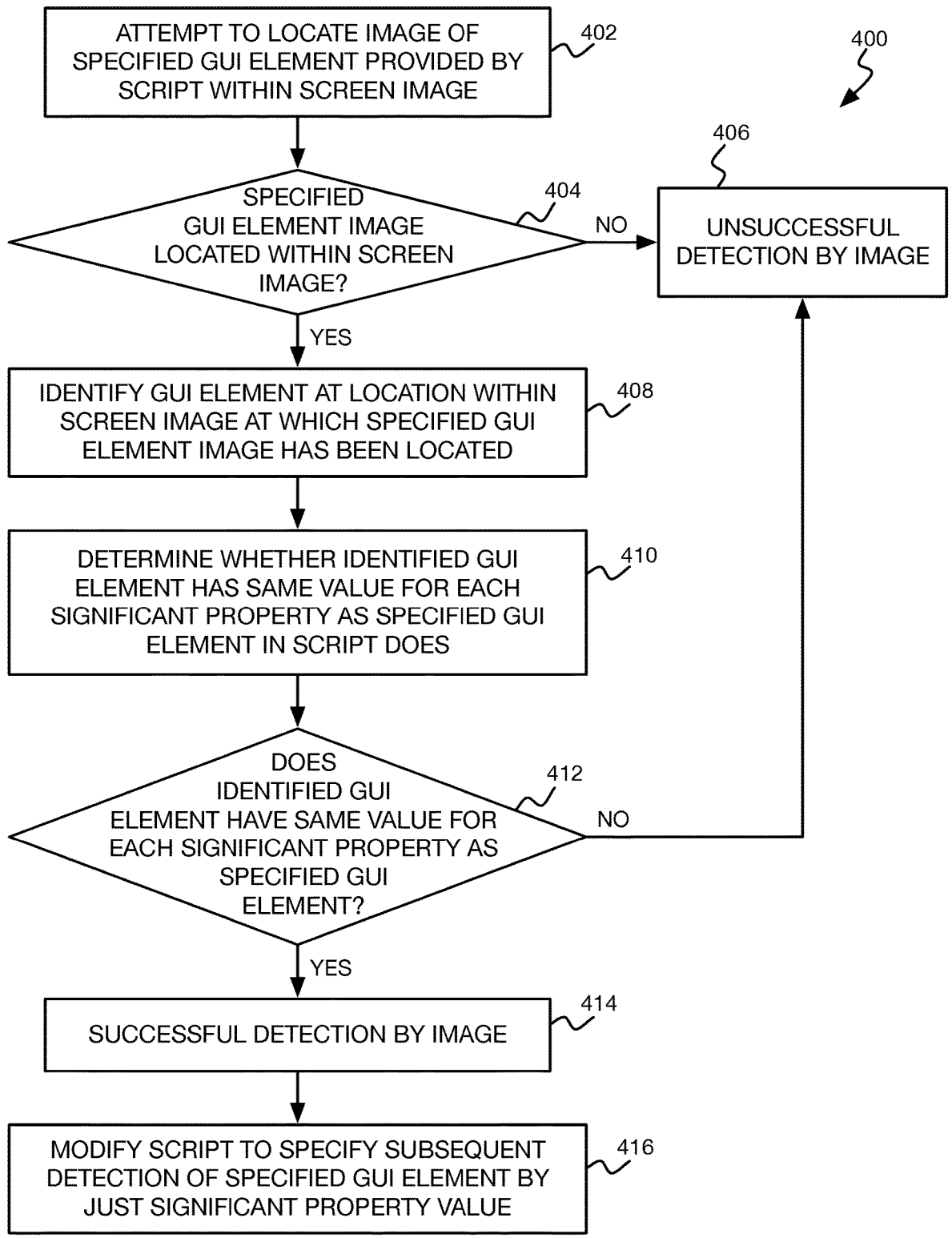

DETECTION OF GRAPHICAL USER INTERFACE ELEMENT OF APPLICATION UNDERGOING FUNCTIONAL TESTING

BACKGROUND

Computing devices can run user-focused applications in which users interact with graphical user interface (GUI) elements that the applications display to cause the applications to perform desired functionality. Such applications can include those that execute on the same computing devices on which users interact with the applications, like applications running on computing devices such as smartphone, tablet, and more traditional laptop and desktop computing devices. The applications can further include those that primarily execute on one computing device, like a server computing device, and with which users interact via another computing device, like a client computing device that may be a smartphone, tablet, or a more traditional computing device. The latter applications can include web applications, or web apps, which can run within web browser programs on the client side.

BRIEF DESCRIPTION OF THE DRAWINGS

FIGS. 1A and 1B are diagrams of illustrative example depiction of an application undergoing automated functional testing.

FIG. 2 is a flowchart of an example method for detecting whether an application undergoing automated functional testing has displayed a graphical user interface (GUI) element.

FIG. 3 is a flowchart of an example method for detecting whether an application undergoing automated functional testing has displayed a GUI element by property values.

FIG. 4 is a flowchart of an example method for detecting whether an application undergoing automated functional testing has display a GUI element by image.

DETAILED DESCRIPTION

Figure 5A:
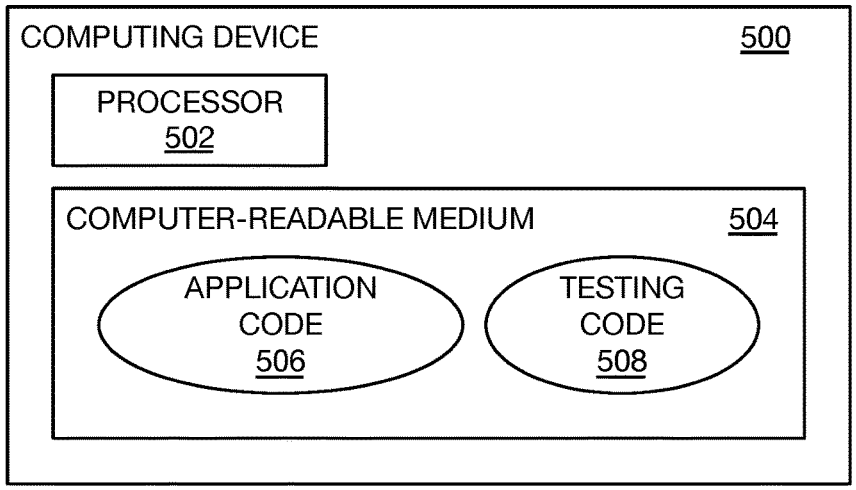
FIG. 5A is a diagram of an example computing device.

As noted in the background, in user-focused applications, users interact with graphical user interface (GUI) elements that the applications display to cause the applications to perform desired functionality. There are a large variety of different GUI elements that applications can employ. As non-exhaustive examples, GUI elements may include text boxes that a user can select and enter text in, radio buttons and dropdown list boxes that permit the user to select an option from a number of different options corresponding to the buttons and list box items, respectively, and checkboxes that permit the user to select multiple options corresponding to the boxes. As other non-exhaustive examples, GUI elements can include toggle switches that permit the user to select from two options, and action buttons that the users can affirmatively select to perform actions like submit, cancel, and so on.

Development of user-focused applications thus concerns permitting users to interact with GUI elements displayed by the applications so that the users can perform desired functionality. Before applications are deployed to end users, they may be rigorously tested so that, for instance, the applications perform the correct functionality, including displaying the correct GUI elements at the correct times. Shrinking development cycles means that testing has to be performed within shorter periods of time. Meanwhile, applications have tended to increase in complexity, while user patience for bugs and other operational flaws in application execution has decreased, particularly with the increasing number of applications that are available to end users.

An approach to managing these constraints is to perform automated functional testing of an application. The testing is functional in that it determines whether an application operates correctly. The testing is automated in that it can be performed without tester (i.e., human) intervention or interaction during testing. For example, unautomated functional testing can involve testers who interact with an application as end users are expected to, to verify that the application is operating correctly. Automated functional testing involves a computing device itself interacting with an application, simulating user input in relation to the GUI elements as if a human end user were interacting with the application, to verify that the application is operating correctly.

Automated functional testing of an application thus can entail a script of ordered actions that are to be performed in relation to the GUI elements that the application displays. Each action can include two parts. First, the action can identify a particular GUI element of the application. Second, the action can specify the operation that should be performed in relation to the GUI element. Therefore, a computing device performing automated functional testing of an application proceeds through the script. For a given action of the script, the computing device detects the GUI element identified by the script action as displayed by the application, and may then responsively perform an operation in relation to the GUI element once it has been detected. If the GUI element is not detected, then automated functional testing may prematurely terminate with an indication that the application is not performing correctly (i.e., testing has failed).

Detection of a GUI element identified by an action in a script can be performed in a number of different ways. The script action may identify a GUI element by values for a number of different properties of the GUI element. The greater the number of properties for which the action specifies values to particularly identify the GUI element, the lesser the likelihood that automated functional testing will incorrectly identify a different GUI element (i.e., a false positive). However, at the same time, the greater the number of properties for which the action specifies values to particularly identify the GUI element, the greater the likelihood that automated functional testing will fail to correctly detect the GUI element (i.e., a false negative). An approach to mitigating false negatives is to iteratively decrease the number of properties that have to have their specified property values matched to detect a GUI element, but this approach does not mitigate, and indeed increases, the potential for false positives.

Another approach for detecting a GUI element identified by an action in script during automated functional testing of an application is by image. The script action may include or specify an image of what the rendered GUI element should look like when the application displays the GUI element. Detection of the GUI element thus includes inspecting an image of the screen on which the application is displaying GUI elements to determine whether it includes the image of the desired GUI element in question. However, GUI element detection by image is generally slower than GUI element detection by property values, and in some cases may be less reliable than detecting GUI elements by property values. Both approaches, then, have drawbacks, however.

Disclosed herein are techniques to detect a GUI element of an application undergoing functional testing that combine GUI element detection by property values with GUI element detection by image. Automated functional testing first attempts to detect a GUI element identified in a script action by property values. However, if automated functional testing fails to successfully detect the GUI element by property values, then the testing attempts to detect the GUI element by image. Therefore, the faster approach that is less likely to elicit false positives (detection by property values) is performed by default, with the slower and potentially less reliable approach (detection by image) being performed just if the former approach fails to successfully detect the GUI element in question. The techniques described herein thus improve the capabilities of computing devices that perform automated functional testing of applications, by rendering such testing more accurate in identifying GUI elements displayed by the applications.

Furthermore, the techniques can improve GUI element detection by image, by performing a more limited property values matching once an image of a GUI element specified by a script action has been located within a screen image. If GUI element detection by property values fails, but the image of the GUI element is located within the screen image, the automated functional testing may not consider the GUI element as having been successfully detected until it performs a further, more limited matching of property values. The GUI element identified by image may still have to match a subset of the property values specified by the script action that are considered the most significant, for instance. As such, the techniques described herein can improve the capabilities of computing devices that perform automated functional testing of applications, by also improving how GUI element detection by image occurs, decreasing the likelihood of false positives in such detection. Indeed, the techniques may modify how a GUI element is to be detected by property values during subsequent automated functional testing of the application iteration by property values occurs when the significant property values subset is successfully matched.

FIGS. 1A and 1B illustratively depict an example of an application undergoing functional testing. The application may be a web application, or web app, or another type of application. In the specific example of FIGS. 1A and 1B, the application may be undergoing functional testing at least in part to ensure that the application correctly performs account maintenance functionality. For instance, a user may have an account, such as a financial account by which he or she pays for goods or services, which can be modified. In the example of FIGS. 1A and 1B, the functionality by which the user can change details regarding the account is tested.

In FIG. 1A, the application undergoing testing displays a screen 100 including text box GUI elements 102 and button GUI elements 104. The text box GUI elements 102 include associated labels "account name," "account number," and "expiration date," that identify the information that is to be input into the text boxes. Functional testing thus involves simulating user selection of each text box, and entering in data, such as "Mary Smith," "5555 5555 5555 4444," and "02/2022" within the text boxes. The button GUI elements 104 include an OK button and a cancel button. Functional testing can therefore further involve, after simulating user entry of data into the text boxes of the GUI elements 102, simulating user selection of the OK button.

Then, in FIG. 1B, the application undergoing testing responsively displays a screen 110 on which the text "Are you sure you want to change your account number to the account ending in 4444?" is displayed. The application also displays the button GUI elements 114, which includes a yes button and a no button. Functional testing can thus involve, after having selected the OK button on the screen 100 in FIG. 1A, simulating user selection of the yes button on the screen 110 in FIG. 1B.

A script directs such automated functional testing of an application, and as has been noted, can include a series of ordered actions. In relation to the screen 100 of FIG. 1A, the script may include the following actions:
SELECT TEXT BOX WITH LABEL "Account Name"
ENTER "Mary Smith"
PRESS TAB KEY
ENTER "5555 5555 5555 4444"
PRESS TAB KEY
ENTER "02/2022"
SELECT OK BUTTON In relation to the screen 110 of FIG. 1B, the script may include the following actions:
VERIFY TEXT INCLUDES "4444"
SELECT YES BUTTON The foregoing example is specifically a pseudo-code representation of script operations. Automated application functional testing scripts may in actuality be written in a number of different script formats, such as Java, JavaScript, and Visual Basic Script (VBScript), for instance.

A computing device functionally testing an application in an automated manner may thus perform the series of actions of the script. A script action that directs the computing device to perform functionality in relation to a GUI element effectively causes the computing device to first detect whether the application has displayed the GUI element on the screen, and then perform the specified functionality in relation to the GUI element if the element has been detected. If the computing device cannot detect that the application has displayed the GUI element on the screen, then the device may prematurely terminate and fail functional testing of the application.

As a specific example, in relation to FIG. 1B, if the application undergoing automated functional testing fails to display the yes button, then the computing device functionally testing the application will not be able to detect this button, and thus may prematurely terminate and fail the functional testing of the application. Likewise, if the application displays the yes button as specified by the script, then the computing device will be able to detect the button and continue functional testing of the application. For instance, the computing device may continue testing by simulating user selection of the yes button.

However, the application may specify the yes button in a manner different than the script does, in which case the computing device functionally testing the application may incorrectly fail and prematurely terminate the functional testing of the application. For example, the application may display the button in a different location than that specified by the script, such as lower and/or to the left than its location in FIG. 1B. That is, the application may specify the location attribute of the button as "LOCATION=(X1,Y1)" whereas the script may expect the location attribute of the button to be "LOCATION=(X2,Y2)," where X1≠X2 and/or Y1≠Y2. As another example, the application may internally label the button as "BUTTON='SUBMIT'" even though the displayed text label remains "yes," whereas the script may specify this attribute as "BUTTON='YES.'" In such instances in which the script specifies the attributes of a GUI element slightly differently than those that the application actually uses, the computing device should still be able to correctly discern that the application has in fact displayed a GUI element, so that automated functional testing of the application does not incorrectly fail.

FIG. 2 shows an example method 200 for detecting a GUI element of an application undergoing functional testing. A computing device functionally testing the application can perform the method 200. The method 200 may be implemented as program code stored on a non-transitory computer-readable data storage medium and executed by the computing device. The method 200 may be performed as part of functional testing of the application as directed by a script. For instance, the script may specify an operation to be performed in relation to a GUI element, such that the GUI element is first detected in accordance with the method 200 prior to the operation being performed.

Property values of the GUI element to be detected and an image of this GUI element are received (202). The script may list the GUI element property values and reference the GUI element image within a script operation specifying an action that is to be performed once the GUI element has been detected, or in a different portion of the script. For instance, the script may begin with specification of GUI elements by property values, as well as specification of images of the GUI elements, which are the subject of subsequent operations within the script.

The property values of a GUI element include a value for each of a number of different properties. Different types of applications may specify elements by properties in different ways. The properties of a GUI element can include location (i.e., the relative x, y coordinates at which the GUI element is to be displayed on a screen); GUI element type (e.g., text box, radio button, and so on); internal name, which may not be displayed when the GUI element is displayed; identifier, which may be a unique identifier; text label, which may be displayed when the GUI element is displayed; and so on.

When an application displays a GUI element, the computing device functionally testing the application is able to identify the property values of the displayed GUI element. For example, in the context of a web application, a client computing device running a browser program (and that is also functionally testing the web application) may itself render and display the GUI element responsive to receiving the property values for the GUI element from a server computing device that is actually running the web application. The browser program thus renders and displays the GUI element at the client computing device in accordance with the received property values.

The image of a GUI element is an image of what the application expects the GUI element to look like when the GUI element is displayed on a screen at a computing device. The image may be in an image format like JPG, PNG, or a different image format. The image may thus be effectively considered as a "screen shot" of the rendered and displayed GUI element. The image of the GUI element may be stored as part of the script itself, or the script may reference where the image is stored.

When the script directs the computing device functionally testing the application to detect a GUI element, such as by specifying a script operation to perform an action in relation to the GUI element, the computing device detects whether the application has displayed the GUI element (204), by property values. A particular approach to detecting, by property values, whether the application has displayed the GUI element is described later in the detailed description. In part 204, the image of the GUI element is not used to determine whether the application has displayed the GUI element as expected.

If detection of the GUI element by property values is successful (206), then the method 200 continues with the functional testing of the application (208). For example, if the script specified a script operation to perform an action in relation to the GUI element, then functional testing of the application can continue by the computing device that is functionally testing the application performing the script operation in question, since the GUI element has been successfully detected. When the method 200 proceeds to part 208 directly from part 206, the image of the GUI element is not used to detect that the application has displayed the GUI element.

However, if detection of the GUI element by property values is unsuccessful (206), then the method 200 proceeds to detect by image whether the application has displayed the GUI element (210). A particular approach to detecting, by image, whether the application has displayed the GUI element is described later in the detailed description. In part 210, the property values of the GUI element may still be used to verify whether an identified GUI element that has been displayed is indeed the correct GUI element that is being detected.

If detection of the GUI element by image is successful (212), then the method 200 again continues with the functional testing of the application (208). However, if detection of the GUI element by image is unsuccessful (212), then automated functional testing of the application fails and is prematurely terminated (214). Functional testing of the application fails and is prematurely terminated thus if the computing device performing the method 200 is unable to detect the GUI element both by property values in part 204 and by image in part 206.

FIG. 3 shows an example method 300 for detecting a GUI element of an application undergoing functional testing, by property values. The method 300 can thus implement part 204 of the method 200 that has been described. The GUI element is generally detected by evaluating expected property values of the GUI element that have been received against the GUI elements that the application undergoing functional testing has displayed.

Specifically, a computing device performing the method 300 determines whether any GUI element that the application has displayed has the same value for each property as the GUI element specified in the script that the device is attempting to detect does (302). For example, the script may specify the GUI element in question by type and internal name (e.g., "BUTTON='YES'"), by location (e.g., "LOCATION=(X2,Y2)"), and by text label (e.g., "LABEL='YES'"). When the computing device performing functional testing encounters an operation to be performed in relation to this GUI element within the script that is directing the functional application testing, the device evaluates these specified property values against the GUI elements that the application undergoing functional testing has displayed.

If any GUI element displayed by the application has the same value for every property as the GUI element specified in the script does (304), then the method 300 concludes with successful detection, by property value, of the GUI element in question (306). In the example, a GUI element displayed by the application has to have the same internal name, "BUTTON='YES'", same location "LOCATION=(X2,Y2)", and same text label e.g., "LABEL='YES'" to be considered the GUI element that the computing device is attempting to detect. If a displayed GUI element has a different value for any property (304), then the displayed GUI element is not matched as the GUI element specified in the script that the computing device is attempting to detect. The method 300 thus concludes with unsuccessful detection, by property value, of the GUI element (308).

FIG. 4 shows an example method 400 for detecting a GUI element of an application undergoing functional testing, by image (with verification by a subset of property values). The method 400 can thus implement part 210 of the method 200 that has been described. The GUI element is generally detected by evaluating the image of the GUI element that has been received against a screen image of the GUI elements that the application undergoing functional testing has displayed.

Specifically, a computing device performing the method 400 attempts to locate the image of the GUI element that the script has provided within the screen image of the GUI elements that the application has displayed (402). For instance, the application undergoing testing may be a web application executed at a server computing device but that is functionally tested at a client computing device running a web browser program. The browser program thus can render and display the application, including its GUI elements, within a browser window. The computing device captures an image of this window (i.e., in effect, the device takes a "screen shot" of the window), and determines whether this screen image includes the image of the specified GUI element.

If the image of the GUI element in question is not located within the screen image (404), then the method 400 concludes with unsuccessful detection, by image, of this GUI element (406). If the GUI element image is located within the screen image (404), however, then the computing device identifies the GUI element that the application has displayed at the screen image location at which the GUI element image has been located (408). For instance, the computing device may locate the GUI element image at the location (X1,Y1) within the screen image of GUI elements displayed by the application. The computing device thus identifies GUI element that application has displayed at this location (X1,Y1), including its property values.

The computing device determines whether this identified GUI element has the same value for each significant property as the GUI element specified in script that the device is attempting to detect does (410). Of the properties for which the script specifies values for a GUI element, a subset may be considered significant properties. The script may itself identify which properties are significant properties, or a user (i.e., a tester) may configure functional testing of the application to specify which properties are considered significant properties.

If the identified GUI element has the same value for each significant property as the GUI element specified in the script does (412), then the method 400 concludes that successful detection of the specified GUI element, by image, has occurred (414). By comparison, if the identified GUI element has a different value for any significant property than the specified GUI element does (412), then the method 400 concludes with unsuccessful detection, by image, of the specified GUI element (406). When the method 400 proceeds to part 406 directly from part 412, then, unsuccessful detection by image still results even though the image of the specified GUI element has indeed been located in the screen image of GUI elements displayed by the application, since verification by significant property values failed.

As examples, the script may specify the GUI element in question by type and internal name (e.g., "BUTTON='YES'"), by location (e.g., "LOCATION=(X2, Y2)"), and by text label (e.g., "LABEL='YES'"). In one specific example, of type/name, location, and text label properties, just the type/name and text label properties may be specified as significant. If the computing device locates the image of this specified GUI element within the screen image at location (X1,Y1), and if the GUI element that the application displayed at this location has property values "BUTTON='YES'" and "LABEL='YES'", then the displayed GUI element is detected as the specified GUI element. This is because the location property is not considered significant, and therefore that the value for this property differs does not matter during verification.

In another specific example, just the text label and location properties may be specified as significant. If the computing device locates the image of this specified GUI element within the screen image (X2,Y2), and if the GUI element that the application displayed at this location has property values "BUTTON='SUBMIT'", "LABEL='YES'", then the displayed GUI element is detected as the specified GUI element. This is because the type/internal name property is not considered significant, and therefore that the value for this property differs does not matter during verification. Note in this example that while the method 400 will detect the specified GUI element, the method 300 will not, because there is one property value, albeit for a property that is not considered significant, that does not match.

When successful detection by image occurs, in one implementation the computing device functionally testing the application may also modify the script to specify that subsequent detection of the GUI element in question is not occur just by significant property values (416). For example, GUI element detection in the method 300 by values for all properties A, B, C, and D may have failed, but detection of the GUI element in the method 400 by image—with verification for properties B and C that are considered significant—may have succeeded. Therefore, during subsequent functional testing of the application, the method 300 attempts to detect this GUI element just by the values for properties B and C, and not for all properties A, B, C, and D, in this implementation.

Figure 5B:
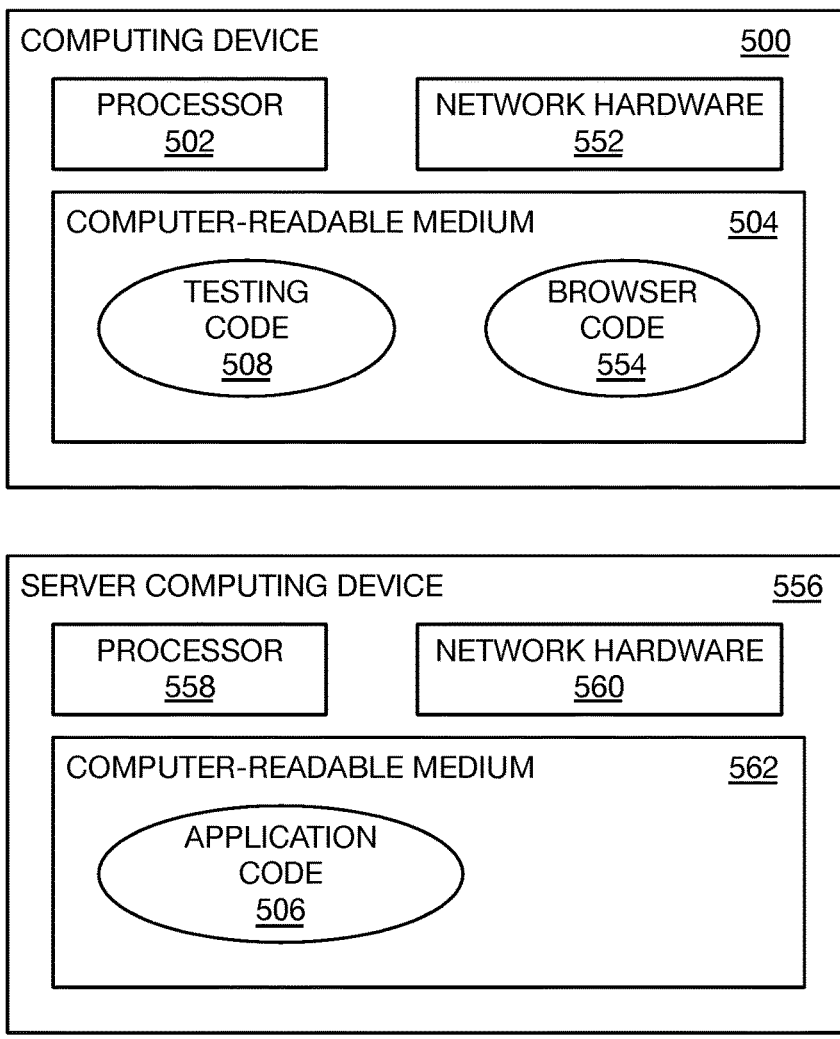
FIG. 5B is a diagram of an example system including an example computing device.

FIGS. 5A and 5B show two example implementations of a computing device 500. The computing device 500 in each implementation includes a processor 502 and a non-transitory-computer readable medium 504 that stores program code executable by the processor 502. In FIG. 5A, the program code includes application code 506 and testing code 508. The processor 502 functionally tests the application forming the application code 506, via the testing code 508. That is, execution of the testing code 508 functionally tests, in an automated manner, the application of the application code 506. The testing code 508 may thus implement the methods that have been described.

Whereas in FIG. 5A the same computing device 500 runs both the application code 506 (and therefore the application) and the testing code 508 that tests the application, in FIG. 5B the computing device 500 does not. In the implementation of FIG. 5B, the program code includes the testing code 508 and also browser code 554. The application is instead executed by a server computing device 556, which like the computing device 500 includes a processor 558 and a non-transitory computer-readable medium 562 that stores the application code 506 that the processor 558 executes.

The computing device 500 interacts with the server computing device 556 while the server computing device 556 executes the application of the application code 506, providing input to and receiving output from the server computing device 556. As such, the computing device 500 and the server computing device 556 respectively include network hardware, like wired or wireless network adapters, to communicate with one another over a network, such as the Internet. The testing code 508 provides input to the application of the application code 506 via a web browser program of the browser code 554. The testing code 508 similarly receives output from the application via the web browser program, which the web browser program may display at the computing device 500.

The techniques that have been described improve automated functional testing of an application, such as a web application, under development. The robustness and accuracy of such testing is particularly improved, by not failing testing of an application when it is not in actuality performing incorrectly. The techniques specifically improve detection as to whether an application undergoing testing has displayed a specific GUI element, by combining detection by property values with detection by image.

We claim:

1. A method comprising:
   receiving, by a computing device functionally testing an application, values for a plurality of properties and an image of a specific graphical user interface (GUI) element, from a script directing functional testing of the application;
   detecting, by the computing device, whether the application has displayed the specific GUI element by evaluating the received values for the properties of the specific GUI element against a plurality of GUI elements that the application has displayed;
   in response to unsuccessfully detecting that the application has displayed the specific GUI element by evaluating the received values for the properties of the specific GUI element against the GUI elements that the application has displayed, detecting, by the computing device, whether the application has displayed the specific GUI element by:
      attempting to locate the received image of the specific GUI element within the screen image including the GUI elements that the application has displayed;
      upon successfully locating the received image of the specific GUI element within the screen image, identifying a displayed GUI element at a location within the screen image at which the received image of the specific GUI element has been located;
   in response to unsuccessfully successfully locating the received image of the specific GUI element within the screen image, failing and prematurely terminating, by the computing device, the functional testing of the application; and
   in response to successfully detecting that the application has displayed the specific GUI element, continuing the functional testing of the application, by the computing device.

2. The method of claim 1, wherein responsive to successfully detecting that the application has displayed the specific GUI element by evaluating the received values for the properties of the specific GUI element against the GUI elements that the application has displayed, the functional testing of the application is continued without having to use the image of the specific GUI element to detect that the application has displayed the specific GUI element.

3. The method of claim 1, wherein detecting whether the application has displayed the specific GUI element by evaluating the received image of the specific GUI element against the screen image including the GUI elements that the application has displayed further comprises:
   upon identifying the displayed GUI element, evaluating the received values of a sub-plurality of the properties of the specific GUI element against the identified displayed GUI element.

4. The method of claim 3, wherein evaluating the received values of the sub-plurality of the properties of the specific GUI element against the identified displayed GUI element comprises:
   determining whether the identified displayed GUI element has a same value for each property of the sub-plurality of the properties as the specific GUI element does.

5. The method of claim 4, wherein evaluating the received values of the sub-plurality of the properties of the specific GUI element against the identified displayed GUI element further comprises:
   in response to determining that the identified displayed GUI element does not have the same value for each property of the sub-plurality of the properties as the specific GUI element does, concluding that detecting whether the application has displayed the specific GUI element by evaluating the received image of the specific GUI element against the screen image including the GUI elements that the application has displayed has been unsuccessful.

6. The method of claim 4, wherein evaluating the received values of the sub-plurality of the properties of the specific GUI element against the identified displayed GUI element further comprises:
   in response to determining that the identified displayed GUI element has the same value for each property of the sub-plurality of the properties as the specific GUI element does, concluding that detecting whether the application has displayed the specific GUI element by evaluating the received image of the specific GUI element against the screen image including the GUI elements that the application has displayed has been successful.

7. The method of claim 4, wherein evaluating the received values of the sub-plurality of the properties of the specific GUI element against the identified displayed GUI element further comprises:
   in response to determining that the identified displayed GUI element has the same value for each property of the sub-plurality of the properties as the specific GUI element does, modifying the script to specify that the specific GUI element is to be detected during subsequent functional testing by the sub-plurality of the properties instead of by the plurality of the properties.

8. The method of claim 1, wherein detecting whether the application has displayed the specific GUI element by evaluating the received image of the specific GUI element against the screen image including the GUI elements that the application has displayed further comprises:
   upon unsuccessfully locating the received image of the specific GUI element within the screen image, concluding that detecting whether the application has displayed the specific GUI element by evaluating the received image of the specific GUI element against the screen image including the GUI elements that the application has displayed has been unsuccessful.

9. The method of claim 1, wherein the sub-plurality of the properties are user specified by GUI element type.

10. The method of claim 1, wherein detecting whether the application has displayed the specific GUI element by evaluating the received values of the properties of the specific GUI element against the GUI elements that the application has displayed comprises:

determining whether any of the GUI elements that the application has displayed has a same value for each property of the properties as the specific GUI element does;

in response to determining that any of the GUI elements has the same value for each property of the properties as the specific GUI element does, concluding that detecting whether the application has displayed the specific GUI element by evaluating the received values of the properties of the specific GUI element against the GUI elements that the application has displayed has been successful; and in response to determining that none of the GUI elements has the same value for each property of the properties as the specific GUI element does, concluding that detecting whether the application has displayed the specific GUI element by evaluating the received values of the properties of the specific GUI element against the GUI elements that the application has displayed has been unsuccessful.

11. A computing system comprising:

a processor; and a non-transitory computer-readable storage medium storing program code executable by the processor to functionally test an application as directed by a script, including:

detecting whether the application has displayed a specific graphical user interface (GUI) element primarily by values for a plurality of properties of the specific GUI element as specified by the script and secondarily by an image of the specific GUI element as specified by the script;

in response to unsuccessfully detecting that the application has displayed the specific GUI element, failing and prematurely terminating functional testing of the application; and in response to successfully detecting that the application has displayed the specific GUI element, continuing the functional testing of the application, wherein the processor detects that the application has displayed the specific GUI element by the image of the specific GUI element by:

once the image of the specific GUI element has been successfully identified within a screen image of all GUI elements that the application has displayed;

verifying that a displayed GUI element at a location at which the image of the specific GUI element has been located within the screen image matches the values for a sub-plurality of the properties of the specific GUI element.

12. The computing system of claim 11, wherein the processor detects whether the application has displayed the specific GUI element by the image of the specific GUI element just responsive to failing to detect that the application has displayed the specific GUI element by the values for the properties of the specific GUI element.

13. The computing system of claim 11, wherein the program code is further executable by the processor to modify the script to specify that the specific GUI element is to be detected during subsequent functional testing by the sub-plurality of the properties instead of by the plurality of properties.

14. The computing system of claim 11, wherein the processor and the non-transitory computer-readable data storage medium are part of a client computing device that further includes:

network hardware to communicate over a network with a server computing device at which the application undergoing the functional testing is being executed.

15. The computing system of claim 11, wherein the processor further executes the application undergoing the functional testing is being executed.

* * * * *